(12) United States Patent
Lee

(10) Patent No.: US 7,275,109 B1
(45) Date of Patent: Sep. 25, 2007

(54) NETWORK COMMUNICATION AUTHENTICATION

(75) Inventor: Michael G. Lee, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 792 days.

(21) Appl. No.: 10/114,100

(22) Filed: Apr. 2, 2002

(51) Int. Cl.
*G06F 15/16* (2006.01)
(52) U.S. Cl. .................. 709/229; 709/203; 709/217; 709/219; 709/225; 713/156; 713/161; 713/168; 713/173; 726/3; 726/16; 726/22; 726/26; 726/27; 726/30
(58) Field of Classification Search ............... 709/203, 709/204, 217, 225, 229, 224, 219; 713/156, 713/161, 168, 173; 726/16, 22, 26, 3, 27, 726/30
See application file for complete search history.

(56) References Cited

U.S. PATENT DOCUMENTS

| | | | | |
|---|---|---|---|---|
| 5,222,140 A * | 6/1993 | Beller et al. ................. | 380/30 |
| 5,715,403 A * | 2/1998 | Stefik .......................... | 705/44 |
| 5,754,772 A * | 5/1998 | Leaf ............................ | 709/203 |
| 5,991,399 A * | 11/1999 | Graunke et al. ............. | 380/279 |
| 6,006,328 A * | 12/1999 | Drake .......................... | 726/23 |
| 6,161,185 A * | 12/2000 | Guthrie et al. ................. | 726/5 |
| 6,173,311 B1 * | 1/2001 | Hassett et al. ............... | 709/202 |
| 6,272,536 B1 * | 8/2001 | van Hoff et al. ............. | 709/217 |
| 6,353,891 B1 * | 3/2002 | Borella et al. ................. | 726/12 |
| 6,418,466 B1 * | 7/2002 | Bertram et al. ............. | 709/221 |
| 6,418,472 B1 * | 7/2002 | Mi et al. ..................... | 709/229 |
| 6,425,000 B1 * | 7/2002 | Carmello et al. ............ | 709/217 |
| 6,510,464 B1 * | 1/2003 | Grantges et al. ............. | 709/225 |
| 6,510,513 B1 * | 1/2003 | Danieli ....................... | 713/156 |
| 6,615,350 B1 * | 9/2003 | Schell et al. ................. | 713/168 |
| 6,643,701 B1 * | 11/2003 | Aziz et al. ................... | 709/227 |
| 6,671,262 B1 * | 12/2003 | Kung et al. ................. | 370/260 |
| 6,700,964 B2 * | 3/2004 | Schmid et al. .............. | 379/189 |
| 6,751,731 B1 * | 6/2004 | Binding et al. ............. | 713/171 |
| 6,772,188 B1 * | 8/2004 | Cloutier ....................... | 709/224 |
| 6,823,454 B1 * | 11/2004 | Hind et al. ................... | 713/168 |
| 6,836,845 B1 * | 12/2004 | Lennie et al. ............... | 713/181 |
| 6,847,995 B1 * | 1/2005 | Hubbard et al. ............ | 709/223 |
| 6,882,951 B2 * | 4/2005 | Eden et al. ................... | 702/121 |
| 6,934,756 B2 * | 8/2005 | Maes .......................... | 709/227 |
| 7,069,432 B1 * | 6/2006 | Tighe et al. ................. | 713/151 |
| 2002/0013910 A1 * | 1/2002 | Edery et al. ................. | 713/201 |
| 2002/0152399 A1 * | 10/2002 | Smith .......................... | 713/200 |
| 2003/0182551 A1 * | 9/2003 | Frantz et al. ................ | 713/170 |

* cited by examiner

*Primary Examiner*—Michael Won
(74) *Attorney, Agent, or Firm*—Mintz Levin Cohn Ferris Glovsky and Popeo PC

(57) ABSTRACT

A communication system, for use with a communications network, includes a client configured to communicate with the server via the network. The client includes an input configured to receive a communication from a server via the network, a data set with identifiable portions, and an apparatus coupled to the interface and coupled and configured to select a portion of the data set, the apparatus being further configured to process the selected portion of the data set and a portion of the communication in accordance with an authentication function to produce an authentication result, where the selected portion of the data set is configured to serve a function independent of being used in accordance with the authentication function.

24 Claims, 4 Drawing Sheets

NETWORK COMMUNICATION AUTHENTICATION

FIELD OF THE INVENTION

The invention relates to client-server communications and more particularly to authenticated communications between a server and a client.

BACKGROUND OF THE INVENTION

Communication between clients and servers over networks frequently involve sensitive information and/or commands. Clients may be providing credit card numbers or other personal data. Servers may be providing similar sensitive data, and may also issue commands that it would be undesirable to respond to if the entity issuing the command is not in fact the server. Information and commands are frequently carried over common networks that are freely accessible to numerous persons, some of whom may unethically, and even illegally interfere with or use communications not intended for them. For example, an attacker could bombard a client with undesired messages, "listen in" on communications not intended for the attacker, and even prompt communication from the server or the client and have the response directed to the attacker.

An example of client-server communications is voice over IP (VoIP) telephony, with exemplary VoIP phones being "stimulus" devices. No intelligence resides in the client/phone other than for responding to commands or sending status. The client sends telephony state status such as on-hook/off-hook, and keypad closures, and accepts commands from the server. All other intelligence between the client and server is contained in the server. The call server maintains the telephony state, issues all commands, and writes directly to the display of the phone. These commands and status are issued over a common Internet Protocol (IP) network. Since the IP network is open to anyone who can connect to the network, there is a serious security concern because persons could easily issued commands to i2004 phones. Malicious persons could, e.g., deny service to the phone, disrupt phone service, or even take command of the phone. A possible, serious attack could involve an attacker turning on a microphone of the i2004 phone set, directing the audio from the microphone to the attacker's location, and listening to this audio. Using the technique, the attacker could listen in to any audio in the vicinity of the phone, such as conversations in the phone user's office, unbeknownst to the phone user.

SUMMARY OF THE INVENTION

In general, in an aspect, the invention provides a communication system, for use with a communications network, including a client configured to communicate with the server via the network. The client includes an input configured to receive a communication from a server via the network, a data set with identifiable portions, and an apparatus coupled to the interface and coupled and configured to select a portion of the data set, the apparatus being further configured to process the selected portion of the data set and a portion of the communication in accordance with an authentication function to produce an authentication result, where the selected portion of the data set is configured to serve a function independent of being used in accordance with the authentication function.

Implementations of the invention may include one or more of the following features. The data set is DSP code data associated with a DSP of the apparatus. The apparatus is configured to determine the selected portion of the data set by analyzing a range portion of the communication specifying a range of addresses associated with the DSP code data. The data set is common to at least one other similarly-configured client. The portion of the communication includes at least one of a command and a replay protector. The portion of the communication includes both the command and the replay protector, and wherein the replay protector is a counter. The apparatus is further configured to compare the authentication result with an authentication portion of the communication, and to process a command portion of the communication only if the authentication result meets at least one predetermined criterion. The apparatus is configured to process the command portion of the communication only if the authentication portion of the communication and the authentication result match. The portion of the communication includes a counter value, and wherein the apparatus is further configured to process a command portion of the communication only if the counter value meets at least one predetermined counter criterion. The at least one predetermined counter criterion is that the counter value is one increment different from a last-received counter value.

Implementations of the invention may also include one or more of the following features. The authentication function is a hashing algorithm. The algorithm includes software instructions and a processor that operates in accordance with the software instructions. The client is a telephone that further comprises a microphone and a speaker. The system further includes a communications server configured to select the selected portion of the data set, to provide a command, to provide a counter value, and to apply the authentication function to the selected portion of the data set, the command, and the counter value to produce an expected authentication result and to transmit an indication of the selected portion of the data set, the command, the counter value, and the expected authentication result to the communications client via the network.

In general, in another aspect, the invention provides a communication server, for use with a communication network and a communication client, including a memory, a server, and an output. The memory stores shared information that is also stored by the client, the shared information being stored in addressed portions. The server processor is coupled to the memory and is configured to select a portion of the shared information, to obtain communication data of a communication, to apply an authentication function to the selected portion of the shared information and the communication data to produce an expected authentication result, and to issue the communication, including an indication of the selected portion of the shared information, the communication data, and the expected authentication result. The output is coupled to the server processor and is configured to convey the communication from the server processor to the network. The selected portion of the shared information is configured to serve a function independent of being used in accordance with the authentication function.

Implementations of the invention may include one or more of the following features. The communication data includes a command and a replay protection value, and wherein the server processor is configured to effect the replay protection value. The replay protection value is a counter value. The authentication function is a hashing algorithm.

In general, in another aspect, the invention provides a method of communicating sensitive commands over a communications network. The method includes accessing first authenticating data in a first device coupled to the communications network, obtaining the sensitive command in the first device, effecting a replay protection value in the first device, processing the first authenticating data, the command, and the replay protection value in the first device to obtain a first authentication check code, transmitting the command, the replay protection value, the authentication check code, and an indication of the first authenticating data from the first device over the network to a second device, accessing second authenticating data in the second device in accordance with the indication of the first authenticating data, processing, in the second device, the second authenticating data, the command, and the replay protection value to obtain a second authentication check code, and implementing, by the second device, the command only if the second authentication check code satisfies at least one authentication criterion.

Implementations of the invention may include one or more of the following features. The first and second authenticating data are identical portions of data intrinsic to at least one of the first and second devices. The first and second authenticating data are DSP code of at least one of the first and second devices. The method further includes selecting the first authenticating data from a set of data larger than the first authenticating data. The method further includes setting an authenticated-communication indicator, transmitting the authenticated-communication indicator from the first device to the second device, and processing, in the second device, to obtain the second authentication check code only if the authenticated-communication indicator indicates that the command is sensitive.

Various aspects of the invention may provide one or more of the following advantages. Malicious attacks upon communication devices may be inhibited. Communications over accessible communications networks can be authenticated. Communications can be provided with replay protection and while guarding against interception and manipulation of the intercepted communication or creation of another communication that would satisfy one or more authentication criteria. Authentication capabilities can be added to existing communication devices with little or no additional hardware. Communication authentication can be provided using existing technology. The invention can be implemented simply, without additional hardware or processing capability relative to existing devices. Communication authentication can be performed quickly, preferably with only sensitive commands being authenticated. Replay attacks and man-in-the-middle attacks may be guarded against and prevented. Message integrity can be provided such that a receiving party has confidence that nobody has tampered with a message received message. Message sources can be authenticated such that a receiving party can confirm the message origin (e.g., a real server versus an imposter). Authentication techniques can be tamper resistant and possibly tamper proof.

These and other advantages of the invention, along with the invention itself, will be more fully understood after a review of the following figures, detailed description, and claims.

DETAILED DESCRIPTION OF PREFERRED EMBODIMENTS

The invention provides techniques for providing secure/authentic communications between a server and a client. The secured/authentic communications can be provided using low-computationally intensive software, and without additional hardware in the client or server. Authenticated communications may be limited to critical communications or commands that are especially undesirable to be implemented if not issued by a desired server. The server may issue authenticatable information or commands by applying a hash algorithm using intrinsic client information such as a portion of the code in the client's digital signal processor (DSP), the information or command itself, and an upcounter. The server would send a reference to the portion of the DSP code, the information or command itself, the value of the upcounter, and the results of the application of the hash algorithm. The client would access the referenced portion of its DSP code, and apply the same hash algorithm to the portion of the DSP code, the information/command, and the upcounter value. The client would further compare the result of the client's application of the hash algorithm with the expected result sent from the server. Only if the determined result matches the transmitted expected result would the client use the information or implement the command.

Figure 1:
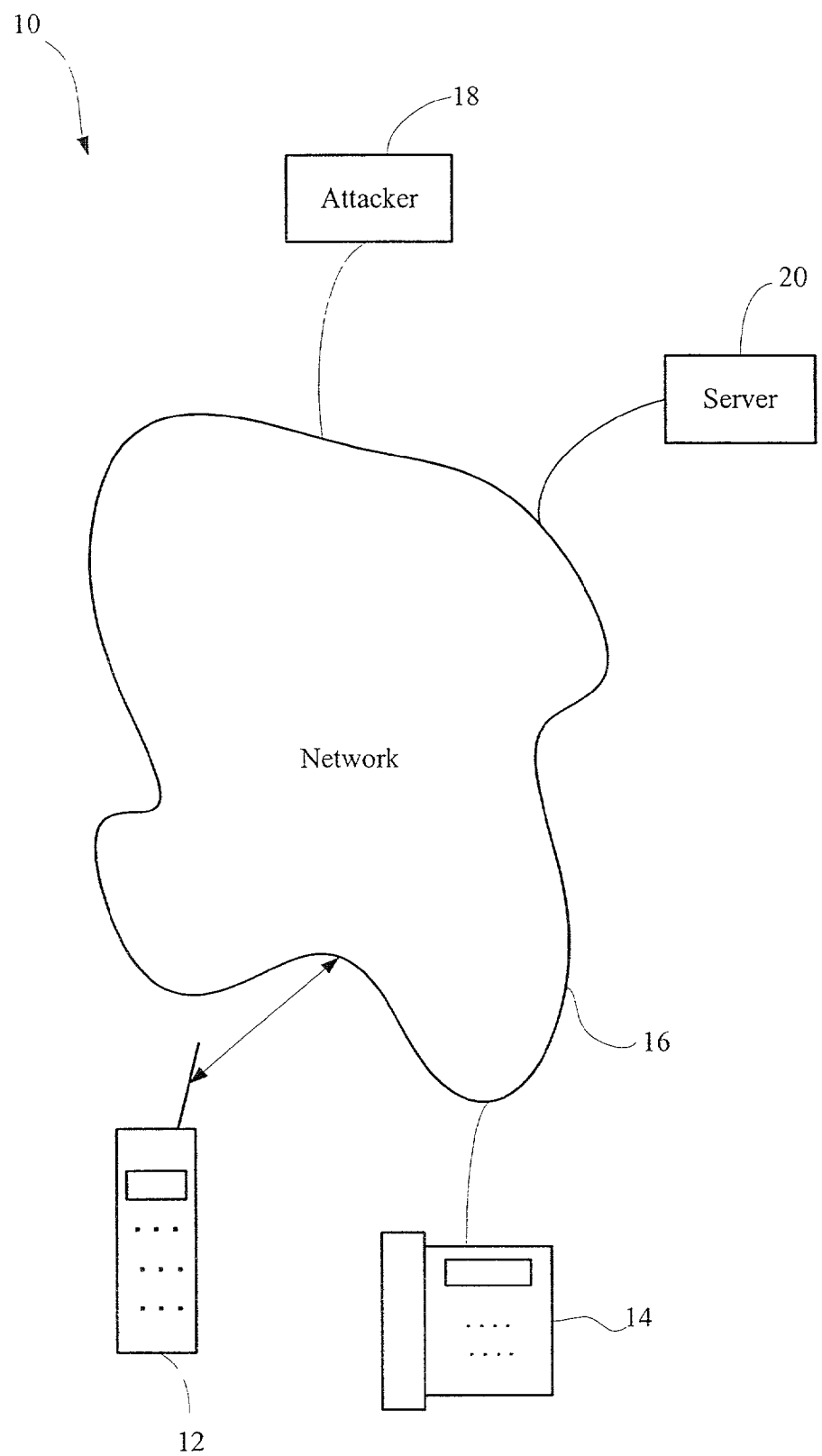
FIG. 1 is a simplified diagram of a communication system including a network, a network-compatible phone, a server, and an attacker.

Referring to FIG. 1, a telecommunications system 10 includes two VoIP phones 12, 14, a network 16, an attacker 18, and a server 20. The phones 12, 14 are configured to transmit and receive voice communications to and from the network 16 using a protocol that runs over the Internet Protocol (IP). The phone 14 may be, e.g., a Nortel Networks Limited i2004 VoIP desktop telephone, in which case the "unitism" protocol would be used running on top of the IP protocol. The IP network 16 includes routers, gateways, and other known mechanisms, in accordance with known network technology, for conveying and translating data packets between sources and destinations such as the phones 12, 14 and the server 20. The network 16 is accessible by many users, including the attacker 18. The attacker 18 includes a computer system including input mechanisms, such as a keyboard, a microphone, and a mouse, and output mechanisms, such as a display and speakers, as well as an operator/user of the computer system (thus, the computer system, the user, or the combination of these are all referred to as the attacker). The attacker computer is configured to communicate with phones 12, 14 through the network 16. The server 20 is configured to communicate with the phones 12, 14, including providing information and issuing commands to the phones 12, 14. Such commands include turning on a microphone of the phones 12, 14.

Without authentication procedures in place, the attacker 18 can undesirably imitate the server and instruct the phones 12, 14 to perform operations that users of the phones 12, 14 may not want the phones 12, 14 to perform. For example, the attacker 18 could instruct the phone 12 to receive audio or data messages supplied by the attacker 18, call a destination, and send the supplied audio or data to the destination. In this way, the attacker 18 could, e.g., fax data to a destination while having the cost for the faxing applied to the bill of the user of the phone 12. The attacker 18 could also instruct the phone 12 to call a premium-rate service location (e.g., a 1-900 number) and run up large expenses for which the legitimate owner of the phone 12 would receive bills. Also, the attacker 18 could instruct the phone 14 to turn its microphone on, and instruct the phone 14, or the network 16, to direct the audio messages from the phone 14 to the attacker 18. In this way, the attacker could use the phone 14 as an eavesdropping device. The attacker 18 could also direct a telephone call to call a long distance number but not turn on the audio channel, thus allowing the attacker 18 to send audio packets such that the attacker 18 could effectively obtain free long distance telephone service.

Figure 2:
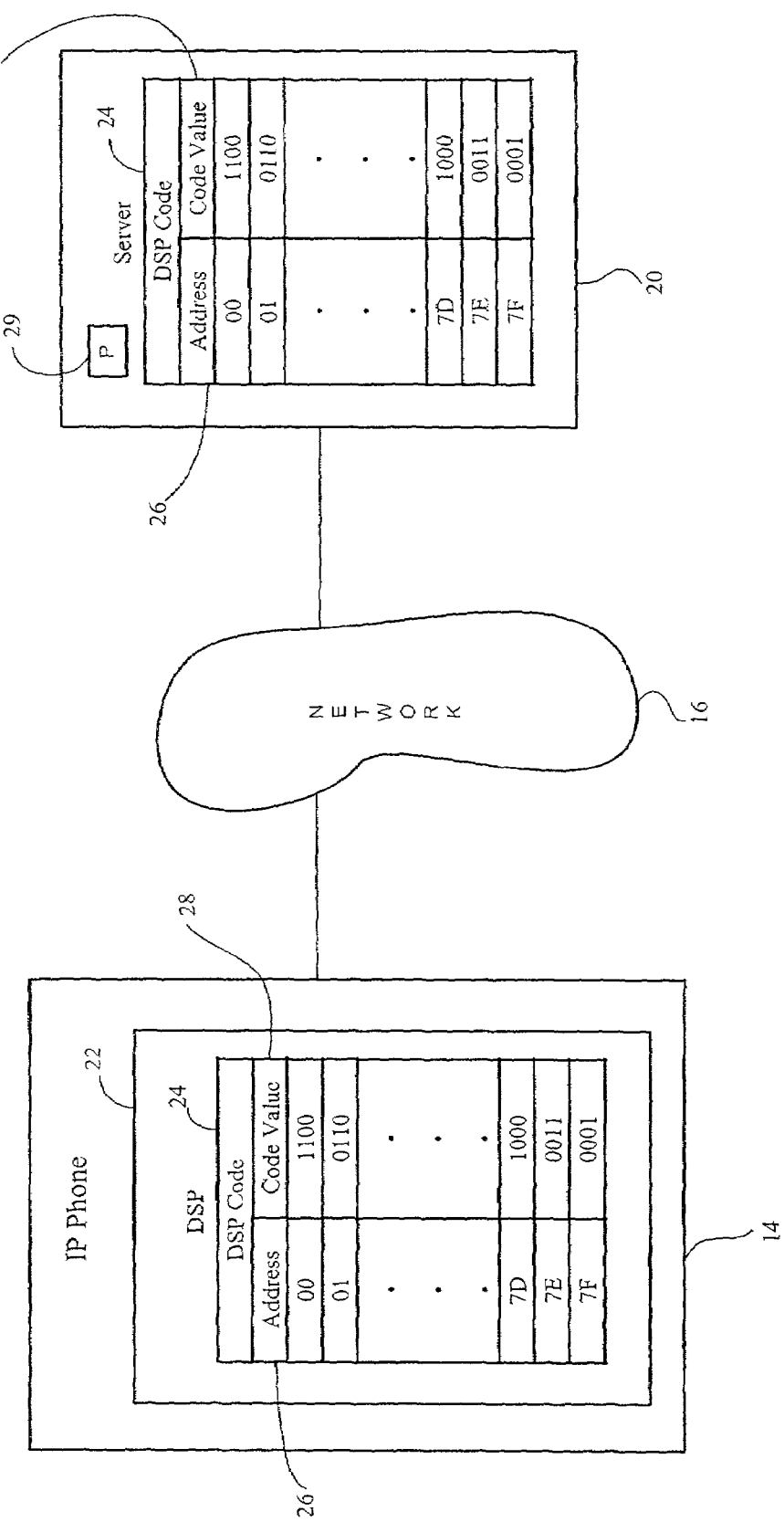
FIG. 2 is a simplified block diagram of the phone, the network, and the server shown in FIG. 1.

Referring to FIG. 2, the phone 14 includes a DSP 22, including DSP code 24 stored in memory within the DSP 22, and the server 20 also includes the DSP code 24. A microprocessor (not shown) controls operation of the phone 14. The DSP code 24 is firmware code (including, e.g., operation instructions and data arrays) and is secret to the maker of the phone 14. As shown by way of example only, the DSP code 24 has 128 hexadecimal addresses 26 with corresponding 4-bit code values 28. The code 24 shown is exemplary only, and not limiting, as actual numbers of addresses and bit-lengths of code values will likely be different than 128 addresses and 4-bit lengths. Typical codes will have 64K addresses and corresponding values in 16-bit lengths. As the firmware code 24 is intrinsic to the DSP 22 and is secret (as the code 24 is not typically downloaded from the phone 14 or visible on any external bus), the code 24 is used by the invention to provide authentication of information/commands from the server 20 to the phone 14.

The server 20 is configured, e.g., with software and appropriate corresponding hardware in a processor 29, to select a portion of the DSP code 24, to effect a command and a replay protector, and to use this information to produce an authenticatable transmission to the phone 14. The server 20 can select, either randomly or systematically, a range of addresses 26 of the code 24 and access the corresponding code values 28. An up-counter can be incremented by the server 20. The server 20 is configured to use the accessed code values 28, the binary value of information and/or a command to be sent to the phone 14, and a value of the up-counter to determine an authentication result. The server 20 is configured to use the values 28, the information/command, and the up-counter value as inputs to a hashing algorithm, such as the MD-2 (message digest 2) or MD-5 or SHA-1 (standard hash algorithm 1) hash algorithms. These are examples only, as other hashing algorithms, or other coding functions, could be used. The hash algorithm provides the authentication result. Using the MD-2 or MD-5 hash algorithms, the hash result is a 16-byte (128-bit) value regardless of the length of the input.

The server 20 is configured to produce an authentication transmission only if sensitive information, or a sensitive command is to be transmitted to the phone 14. This is not required, however, and all, or at least more than sensitive or critical transmissions, may be configured as authentication transmissions. If only critical transmissions are authenticated, then the server 20 can send an indication (e.g., set a bit in the header) that the transmission is to be authenticated (e.g., if a command is sensitive). The authenticated-command bit thus distinguishes between authenticated (bit set) and unauthenticated (bit not set) transmissions. Examples of sensitive/critical information or commands include commands to activate a microphone of the phone 14, to turn the phone 14 off, to ring the phone 14, to activate reception by the phone 14, to set up audio signal paths and level of audio signals, to set addresses to where audio is to be sent, and to dial digits (in the client-to-server direction).

Figure 3:
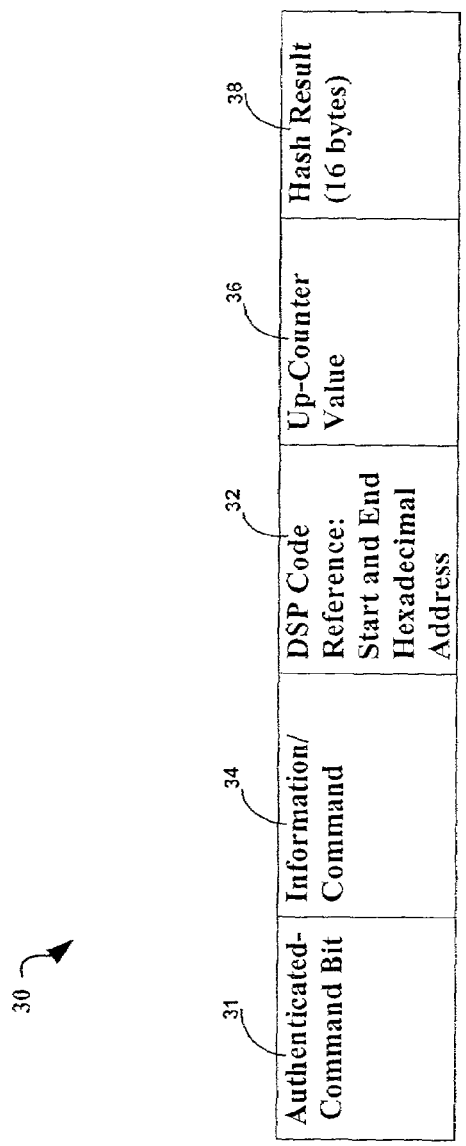
FIG. 3 is a block diagram of a generic transmission between the server and the phone shown in FIG. 1.

The server 20 is further configured to send authentication transmissions in a format 30 shown generally in FIG. 3. The format 30 includes the authenticated-command bit 31, the information/command 34 to be processed/implemented by the phone 14, a range 32 of DSP code addresses 26, the up-counter value 36, and the hash result 38 determined by applying the hash algorithm to the code values 28 corresponding to the range 32 of addresses 26, the information/command 34, and the up-counter value 36. If the authenticated-command bit 31 is set, e.g., to a binary 1, then the other portions 32, 34, 36, 38 will contain appropriate information. If the bit 31 is not set, e.g., is a binary 0, then the header portions 32, 36, 38, other than the information/command 34, will be nonexistent (or at least devoid of data). The phone 14 uses the same hash algorithm that the server 20 does. If more than one algorithm may be used by the phone 14, then the format 40 would include an indication of which algorithm the phone 14 should use.

Figure 4:
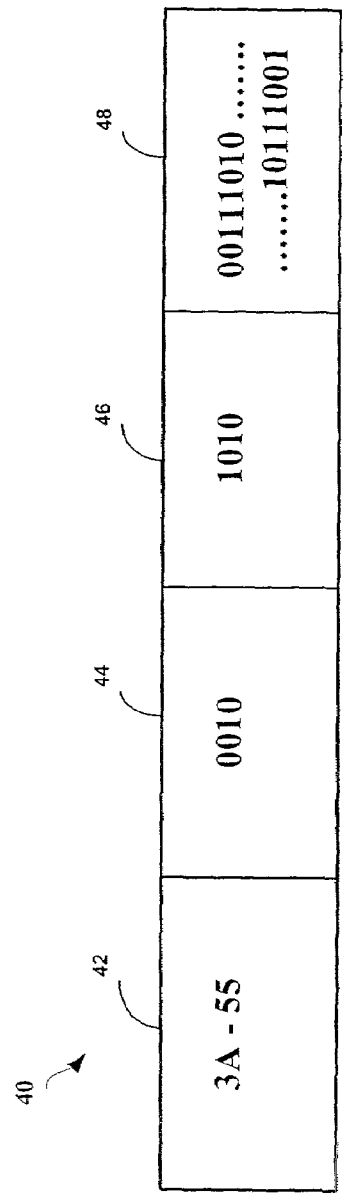
FIG. 4 is a block diagram of an example of the generic transmission shown in FIG. 4.

An exemplary authentication transmission 40 is shown in FIG. 4. The values shown are for illustrative purposes only, and are not necessarily of, e.g., lengths, that would typically be used. As shown, the range 42 of DSP code addresses is 3A-55, indicating the 58$^{th}$ through the 85$^{th}$ code addresses. In this example, the binary value of the information/command is 0010, and the up-counter value is 1010 (i.e., 10 in decimal). Further, the 16-byte value 48 of the hash result is shown to have beginning bytes of 00111010 and ending bytes of 10111001, although these values are given solely to illustrate what the result 48 might look like, and were not derived from any specific values.

Referring to FIGS. 1, 2, and 4, the phone 14 is configured to receive the transmission 40, and through appropriate hardware and software (in a processor such as the DSP 22), process the transmission 40 to determine the transmission's authenticity and process any information or implement any command as appropriate. The phone can determine whether the transmission is to be authenticated (e.g., by reading a bit set by the server indicating so). The phone 14 is configured to apply the appropriate hash algorithm to the values 42, 44, and 46, and compare the result with the result 48 provided in the transmission 40. If the results match, then the phone 14 will process the information 44 appropriately, or execute the command 44 indicated. If the results do not match, then the phone 14 will ignore the transmission 40. The phone 14 may also be configured to take action if the results do not match, such as reporting the mismatch. Also, the phone will ignore the transmission 40, or take other appropriate action, if the up-counter value 46 is not what is expected from the server 20 (e.g., the value 46 is the same as, lower, or more than one increment greater, than the last value 46—i.e., not one increment greater than the last value 46; e.g., the value 46 is not higher than the last value 46—i.e., an acceptable increment is any increment so long as the new value 46 is greater than the last value 46).

The up-counter serves as a replay protector such that the transmission 40 cannot be replayed (e.g., recorded by the attacker 18 and re-sent). The receiving device, here the phone 14, needs to see a new up-counter value 36, that serves as a replay protection value, for each transmission. If the up-counter value 36 is not used in the hashing, then the transmission 40 could be replayed with a new up-counter value 36. If the new value 36 satisfied appropriate criteria, then the receiving device would process the command 34 because the authentication result 38 would match what the receiving device determined. If the up-counter value 36 is used in the hashing, then modifying the up-counter value 36, as needed, would affect the authentication result 38 such that the unmodified result 38 would not match that determined by the phone 14.

Similarly, using the command 34 as part of the hashing to determine the authentication result 38 guards against the attacker's ability to intercept and modify the command 34 and have the command 34 implemented by the phone 14 or other receiving device. If the command 34 is not used to determine the authentication result 38, then the transmission 30 could be intercepted, the command 34 changed, the revised transmission 30 sent to the phone 14 and the new command 34 implemented by the phone 14 as the authentication result 38 would match that determined by the phone. If the command 34 is used in the hashing, then modifying the command 34 would affect the hashing such that the unmodified result 38 would not match that determined by the phone 14.

Figure 5:
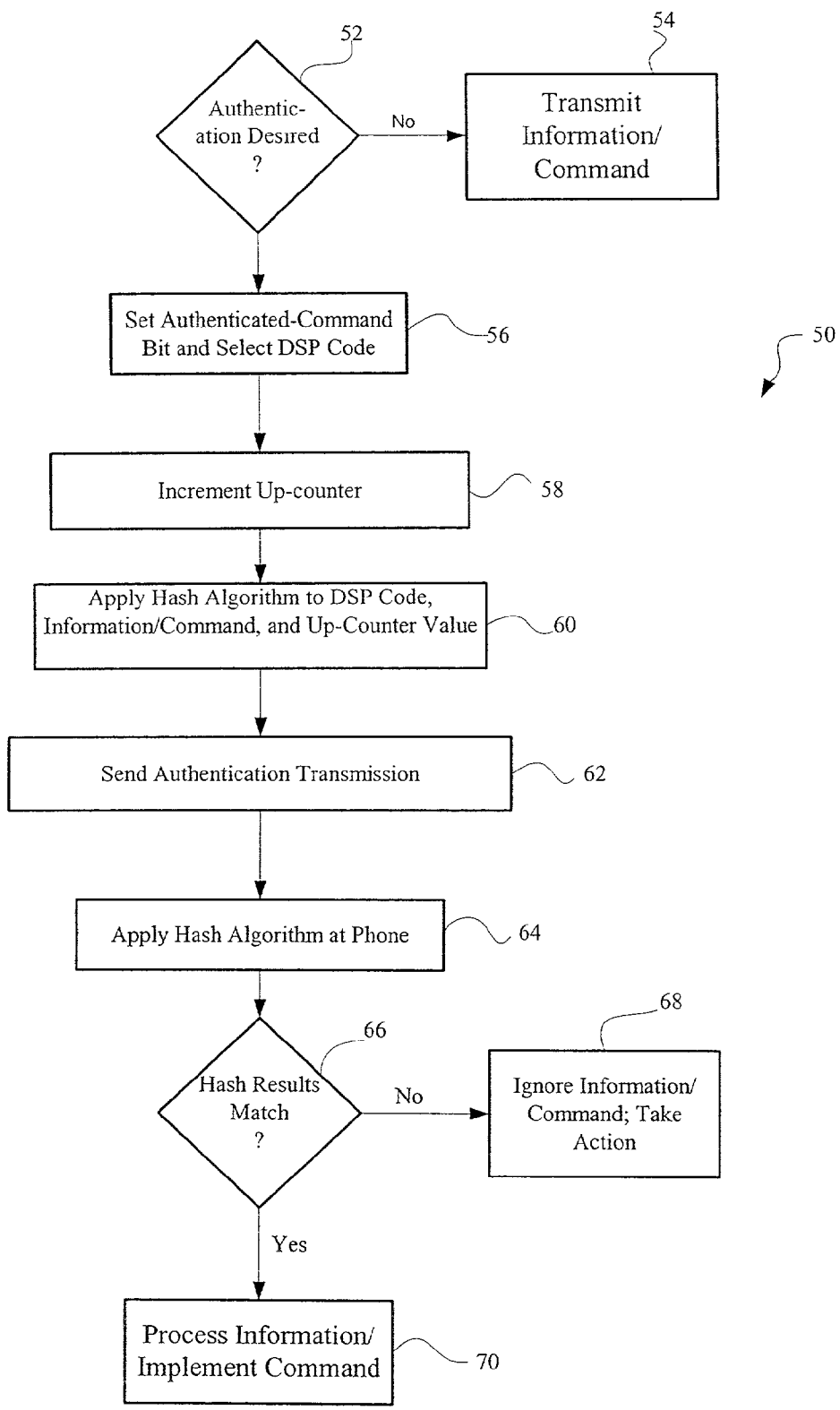
FIG. 5 is a block flow diagram of a method of using the system shown in FIG. 1 to convey authenticatable communications.

In operation, referring to FIG. 5, with further reference to FIGS. 1-4, a process 50 for authenticating server-client communications using the phone and server processors and the authentication transmission 30, 40 includes the stages shown. The process 50, however, is exemplary only and not limiting. The process 50 can be altered, e.g., by having stages added, removed, or rearranged.

At stage 52, the server 20 determines whether a proposed communication to the phone 14 should be authenticated. Here, the server 20 determines whether the information/command 34 to be sent is sensitive/critical in that it would be undesirable to have such information/command not subject to authentication. If authentication is not desired, then the information/command 44 is transmitted to the phone 14 at stage 54 in an appropriate format/protocol such as TCP/IP without being arranged in the authentication transmission format 30.

If at stage 52 the server 20 determines that authentication is desired, then at stage 56 the server 20 sets the authenticated-command bit 31 and selects a portion of the DSP code 24. The selection may be random, e.g., using a random number generator (e.g., to select a beginning address and length of selected portion, with appropriate constraints used), or systematic.

At stage 56, the server 20 increments the up-counter value 46. Initially, the value may be set at all 0's, or may be incremented upon first transmission to all 0's but a 1 in the least-significant digit spot, or some other value (e.g., random). The increment provided by the server 20 may be, e.g., a single, smallest-possible-unit increment, or may be a larger increment.

At stage 60, the server 20 applies a hash algorithm to determine the hash result 48 for inclusion in the authentication transmission 40. The server 20 uses the selected DSP code, the information/command 44 to be sent, and the up-counter value 46 as inputs to the hash algorithm.

At stage 62, the server 20 remotely sends the authentication transmission 40 over the network 16 to the phone 14. The server concatenates the authenticated-command bit 31, the address range of the selected DSP code, the information/command 44, the up-counter value 46, and the hash result 48 into the authentication transmission 40 and sends the transmission 40 to the phone 14.

At stage 64, the phone 14 receives the authentication transmission 40 and applies the same hash algorithm that the server 20 did to the same information that the server 20 did. The phone 14 accesses the DSP code referenced by address range in the authentication transmission 40, and hashes this code, the information/command 44, and the up-counter value 46 to determine a phone hash result.

At stage 66, the phone 14 determines whether the hash results from the server 20 and the phone 14 match. The phone 14 compares the two hash results, e.g., by subtracting the values and comparing to 0, to determine whether they match.

If the hash results determined by the server 20 and the phone 14 do not match, then at stage 68 the information/command 44 is ignored or otherwise processed by the phone 14. The phone 14 can ignore and/or discard the transmission 40. The phone 14 can also take action on the transmission 40, e.g., reporting the mismatch of hash results, e.g., to an analyzer for further processing to determine if the server 20 or phone 14 has a defect, or if there is an attacker attempting to infiltrate the phone 14.

If the hash results from the server 20 and the phone 14 match, then at stage 70 the phone processes the information 44 or implements the command 44 as appropriate. For example, the phone may respond to the command 44 by activating the phone's microphone.

Other embodiments are within the scope and spirit of the appended claims. For example, due to the nature of software, functions described above can be implemented using software, hardware, firmware, hardwiring, or combinations of any of these. Features implementing functions may also be physically located at various positions, including being distributed such that portions of functions are implemented at different physical locations. The device receiving the authentication transmission 40 need not be a phone; other devices may be used as the client for the server-client transmission. Authenticating functions other than the hash algorithms listed, or hash algorithms generally, can be used. The server 20 may comprise a single entity that includes memory for storing the DSP code 24, or may include multiple devices, with a processor disposed in a separate entity from the memory storing the code 24, but that can access the memory. The phone 14 or other device used for authenticated transmissions may be configured to disable downloading of the DSP code 24 or other information used to authenticate communications, and not to (preferably ever) expose the DSP code 24 or the other information on an external bus (or other externally-accessible medium). Also, while the phone 14 has been described as the receiving device and the server 20 as the transmitting device, the server 20 could receive, and the phone 14 transmit, the transmissions 30, 40. Furthermore, data in the phone 14 other than the DSP code 24 may be used in the authentication function. Preferably, however, as with the DSP code 24, these data would serve a function (i.e., at least one function) other than as input to the authentication function. For example, the data could inform, supply data to operated on, and/or affect operation of the phone 14 (e.g., by instructing operations). Preferably, these data are in the DSP 22 (to inhibit tampering), but this is not required. Also, while the above discussion focused on the server 20 sending, and the phone 14, receiving communications to be authenticated, the reverse is also possible with the phone 14 sending and the server 20 receiving and authenticating such communications in accordance with the above descriptions for doing so.

What is claimed is:

1. A communication system, for use with a communications network, comprising:
   a client configured to communicate with a server via the network and comprising:

an input configured to receive a communication from the server via the network;

memory that includes a data set with identifiable portions, wherein the data set comprises executable code stored in the client prior to receipt of the communication; and an apparatus coupled to the memory and the input and coupled and configured to select a portion of the executable code of the data set identified by information received at the input, the apparatus being further configured to use the selected portion of the executable code of the data set and a portion of the communication as inputs to an authentication function to produce an authentication result;

wherein the apparatus is further configured to compare the authentication result with an authentication portion of the communication; and wherein the selected portion of the executable code of the data set is configured to be executed to serve a function independent of being used in accordance with the authentication function.

2. The system of claim 1 wherein the data set is DSP code data associated with a DSP of the apparatus.

3. The system of claim 2 wherein the apparatus is configured to determine the selected portion of the executable code of the data set by analyzing a range portion of the communication specifying a range of addresses associated with the DSP code data.

4. The system of claim 1 wherein the data set is common to at least one other similarly-configured client.

5. The system of claim 1 wherein the portion of the communication includes at least one of a command and a replay protector.

6. The system of claim 5 wherein the portion of the communication includes both the command and the replay protector, and wherein the replay protector is a counter.

7. The system of claim 1 wherein the apparatus is further configured to process a command portion of the communication only if the authentication result meets at least one predetermined criterion.

8. The system of claim 7 wherein the apparatus is configured to process the command portion of the communication only if the authentication portion of the communication and the authentication result match.

9. The system of claim 1 wherein the portion of the communication includes a counter value, and wherein the apparatus is further configured to process a command portion of the communication only if the counter value meets at least one predetermined counter criterion.

10. The system of claim 9 wherein the at least one predetermined counter criterion is that the counter value is one increment different from a last-received counter value.

11. The system of claim 1 wherein the authentication function is a hashing algorithm.

12. The system of claim 1 wherein the algorithm includes software instructions and a processor that operates in accordance with the software instructions.

13. The system of claim 1 wherein the client is a telephone that further comprises a microphone and a speaker.

14. The system of claim 1 further comprising a communications server configured to select the selected portion of the executable code of the data set, to provide a command, to provide a counter value, and to apply the authentication function to the selected portion of the data set, the command, and the counter value to produce an expected authentication result and to transmit an indication of the selected portion of the executable code of the data set, the command, the counter value, and the expected authentication result to the communications client via the network.

15. A communication server, for use with a communication network and a communication client, comprising:

a memory that stores shared information, including executable code, that is also stored by the client, the shared information being stored in addressed portions;

a server processor coupled to the memory and configured to select a portion of the executable code of the shared information, to obtain communication data for a communication, to apply an authentication function to the selected portion of the executable code of the shared information and the communication data to produce an expected authentication result, and to issue the communication, including an indication of the selected portion of the executable code of the shared information, the communication data, and the expected authentication result; and an output coupled to the server processor and configured to convey the communication from the server processor to the network;

wherein the selected portion of the executable code of the shared information is disposed at the client prior to the issuance of the communication and is configured to be executed to serve a function independent of being used in accordance with the authentication function.

16. The server of claim 15 wherein the communication data includes a command and a replay protection value, and wherein the server processor is configured to effect the replay protection value.

17. The server of claim 16 wherein the replay protection value is a counter value.

18. The server of claim 15 wherein the authentication function is a hashing algorithm.

19. A method of communicating sensitive commands over a communications network, the method comprising:

accessing first authenticating data, including executable code, in a first device coupled to the communications network;

obtaining the sensitive command in the first device;

effecting a replay protection value in the first device;

processing the first authenticating data, the sensitive command, and the replay protection value in the first device to obtain a first authentication check code;

transmitting the sensitive command, the replay protection value, the first authentication check code, and an indication of the first authenticating data from the first device over the network to a second device;

accessing second authenticating data, including executable code stored prior to transmission in the second device, in accordance with the indication of the first authenticating data, wherein the executable code is configured to be executed to serve a function independent of being used in accordance with the authenticating;

processing, in the second device, the second authenticating data, the sensitive command, and the replay protection value to obtain a second authentication check code;

comparing, in the second device, the second authentication check code to the first authentication check code; and implementing, by the second device, the sensitive command only if the second authentication check code satisfies at least one authentication criterion.

20. The method of claim 19 wherein the first and second authenticating data are identical portions of data intrinsic to at least one of the first and second devices.

21. The method of claim 19 wherein the first and second authenticating data are DSP code of at least one of the first and second devices.

22. The method of claim 19 further comprising selecting the first authenticating data from a set of data larger than the first authenticating data.

23. The method of claim 19 further comprising setting an authenticated-communication indicator, transmitting the authenticated-communication indicator from the first device to the second device, and processing, in the second device, to obtain the second authentication check code only if the authenticated-communication indicator indicates that the command is sensitive.

24. The method of claim 19 wherein the implementing comprises implementing the sensitive command only if the first authentication check code and the second authentication check code match.

* * * * *